United States Patent
Coccoli et al.

(10) Patent No.: US 10,708,348 B2
(45) Date of Patent: Jul. 7, 2020

(54) HIGH AVAILABILITY IN PACKET PROCESSING FOR HIGH-SPEED NETWORKS

(71) Applicant: INTERNATIONAL BUSINESS MACHINES CORPORATION, Armonk, NY (US)

(72) Inventors: Paul Coccoli, Marietta, GA (US); Gregory L. Galloway, Cumming, GA (US); Cheng-Ta Lee, Taipei (TW); Wei-Shiau Suen, Taichung (TW); Ming-Hsun Wu, New Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 15/236,980

(22) Filed: Aug. 15, 2016

(65) Prior Publication Data

US 2018/0048546 A1 Feb. 15, 2018

(51) Int. Cl.
*H04L 29/08* (2006.01)
*H04L 12/26* (2006.01)
*H04L 12/24* (2006.01)
*H04L 29/14* (2006.01)
(Continued)

(52) U.S. Cl.
CPC ...... *H04L 67/1002* (2013.01); *H04L 41/0893* (2013.01); *H04L 41/12* (2013.01); *H04L 43/0805* (2013.01); *H04L 43/10* (2013.01); *H04L 69/40* (2013.01); *H04L 45/28* (2013.01); *H04L 47/801* (2013.01)

(58) Field of Classification Search
CPC ....... H04L 43/00–43/50; H04L 47/00–47/803; H04L 67/10–67/14; H04L 41/00–41/12; H04L 45/00–45/748; H04L 69/00–69/40
See application file for complete search history.

(56) References Cited

U.S. PATENT DOCUMENTS

| | | | |
|---|---|---|---|
| 6,292,905 B1 * | 9/2001 | Wallach | G06F 9/4411 709/239 |
| 8,891,364 B2 | 11/2014 | Gopinath et al. | |
| 9,100,329 B1 | 8/2015 | Jiang et al. | |

(Continued)

OTHER PUBLICATIONS

Ayuso, P.N. et al., "FT-FW: a cluster-based fault-tolerant architecture for stateful firewalls" Computer Networks (Feb. 2012) pp. 1-21.

*Primary Examiner* — Clayton R Williams
(74) *Attorney, Agent, or Firm* — Tutunjian & Bitetto, P.C.; Vazken Alexanian

(57) ABSTRACT

Methods and systems for high-availability data processing include detecting, at a first data processing system, a change in link state between the first data processing system and a second data processing system. A link state between the first data processing system and a third data processing system is changed responsive to the detection in accordance with a first high availability policy stored at the first data processing system. An identifier of the first data processing system is changed in accordance with the first high availability policy to conform to a second high availability policy stored at the first data processing system. The detection, change of the link state, and change of the identifier are repeated in accordance with the second high availability policy.

18 Claims, 6 Drawing Sheets

(51) Int. Cl.
*H04L 12/927* (2013.01)
*H04L 12/703* (2013.01)

(56) References Cited

U.S. PATENT DOCUMENTS

| | | |
|---|---|---|
| 9,288,138 B2 | 3/2016 | Ghanwani et al. |
| 2006/0195560 A1* | 8/2006 | Newport ............ H04L 41/0893 709/223 |
| 2011/0083046 A1* | 4/2011 | Andrade ............ G06F 11/0793 714/47.1 |
| 2014/0143854 A1 | 5/2014 | Lopez et al. |
| 2014/0258771 A1 | 9/2014 | Xie et al. |
| 2014/0317437 A1 | 10/2014 | LeFevre |
| 2015/0188808 A1 | 7/2015 | Ghanwani et al. |

\* cited by examiner

HIGH AVAILABILITY IN PACKET PROCESSING FOR HIGH-SPEED NETWORKS

BACKGROUND

Technical Field

The present invention generally relates to packet processing and, more particularly, for guaranteeing high availability for packet processing systems in high-speed networks.

Description of the Related Art

Packet processing includes such functions as deep packet inspection and is a key factor in providing network security and monitoring services. When providing packet processing for a high-speed network, for example a modern 100 Gb/s network, a packet processing system needs the processing capacity to handle a full duplex connection. Such a system would therefore need the ability to handle 200 Gb/s. However, at present no system exists that can handle network traffic at such high rates.

To address this shortfall, the traffic is commonly split between multiple processing devices. For example, if a processing device can handle 80 Gb/s of traffic, then three such devices may be used to fully address the 200 Gb/s of traffic. However, simply stacking the three processing devices means that a failure of any one processing device leads to a shortfall of processing power. In one solution, multiple stacks of redundant devices are used. In another solution, a load balancer is used to turn the stack of devices into one logical device, but multiple redundant stacks are still needed. However, in both cases the number of devices needed to ensure high availability is costly and impractical.

SUMMARY

A method for high-availability data processing includes detecting, at a first data processing system, a change in link state between the first data processing system and a second data processing system. A link state between the first data processing system and a third data processing system is changed responsive to the detection in accordance with a first high availability policy stored at the first data processing system. An identifier of the first data processing system is changed in accordance with the first high availability policy to conform to a second high availability policy stored at the first data processing system. The detection, change of the link state, and change of the identifier are repeated in accordance with the second high availability policy.

A high-availability data processing system includes a network interface configured to detect a change in link state between network interface and a second data processing system and to change a link state between the network interface and a third data processing system responsive to said detection in accordance with a first high availability policy. A recovery module is configured to change an identifier of the first data processing system in accordance with the first high availability policy to conform to a second high availability policy. The network interface and the recovery module are further configured to repeat said detection, change of the link state, and change of the identifier in accordance with the second high availability policy.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention employ multiple packet processing devices to fully handle a data stream that has a capacity greater than any one of the packet processing devices. The packet processing devices are arranged in a graph topology, with multiple interconnections between the different processing devices. To minimize the complexity of arranging the processing devices, less than a fully interconnected graph is used, and each device has a predetermined high-availability policy that the device uses to responds to changes in the topology due to the failure of one or more processing devices.

Figure 1:
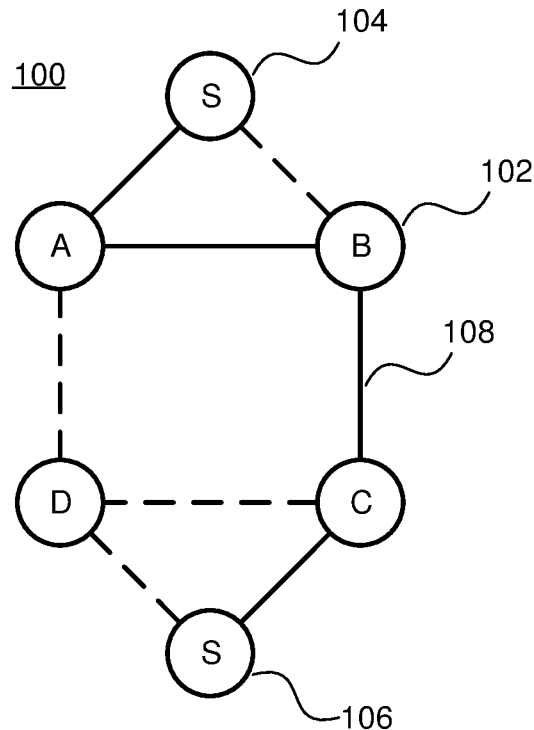
FIG. 1 is a graph diagram representing a high availability data processing network in accordance with the present principles.

Referring now to FIG. 1, a packet processing network 100 is shown that illustrates the arrangement of packet processing nodes 102 between an input 104 and an output 106. Edges 108 represent connections between respective nodes 102, with solid lines representing active connections and dashed lines representing inactive connections. When traffic passes through the network 100, it follows a path from one node 102 to the next in series in accordance with routing policies set locally at each node. In this particular example, there are four nodes 102, with three nodes 102 being needed to provide full coverage for the traffic coming from the input 104. Thus, while only three nodes are needed, a fourth node is provided for redundancy.

In this exemplary embodiment, the four nodes 102 are labeled A, B, C, and D, while the input and output switches 104 and 106 are labeled S. When all of the nodes are operating in this example, the default path goes from the input switch 104 to node A, to node B, to node D, and finally to the output switch 106. Node C is not used, because the three active nodes are sufficient to fully accommodate the full data rate of the data stream.

Figure 2:
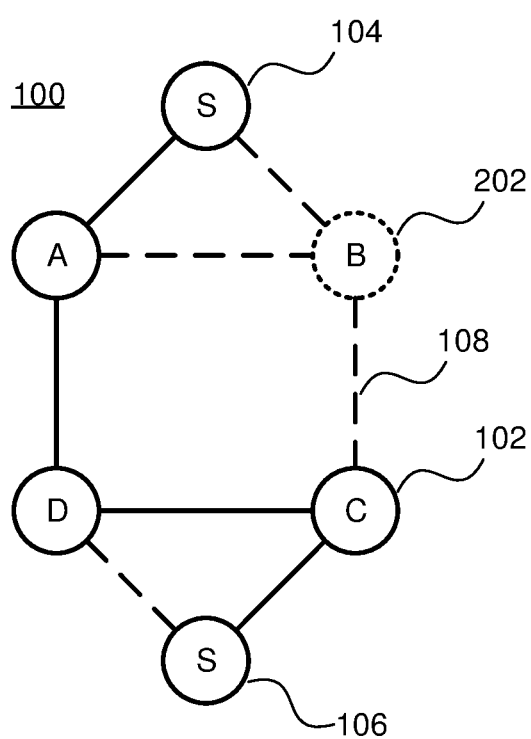
FIG. 2 is a graph diagram representing a high availability data processing network in accordance with the present principles.

Referring now to FIG. 2, the same network 100 is shown, but in this example node B has become an inactive node 202. A node may become inactive for any reason, including a power failure, a loss of network connectivity, a mechanical or electrical failure, etc. When a node becomes inactive, its neighboring nodes detect this change of status. The detection can be accomplished by, e.g., assessing a link state or by sending keep-alive messages between nodes 102.

When an operational node 102 detects that a neighbor has become inactive, the operational node 102 consults a predetermined high-availability policy. Based on this policy, the node 102 turns links 108 on or off to effect a new path through the network 100. In doing so, the node 102 cuts the inactive node 202 out of the path and ensures that sufficient processing power is available to handle the full data rate. The new path reflects a new network state and further routing choices can be made in the same way.

As an example, a network may include five nodes 102, while only needing three active nodes to handle the full data rate. The nodes 102 would therefore each have a first policy that determines how the node 102 reacts if one node out of the five nodes 102 becomes an inactive node 202. After the active nodes 102 adapt to the failure of the inactive node 202, there are four nodes 102 remaining. This presents a similar availability problem on a smaller scale, where three of the four available nodes 102 are needed. If one of the remaining four nodes 102 becomes inactive, the remaining three active nodes 102 determine how to adapt the data path based on their predetermined policies in the same manner as described above.

Figure 4:
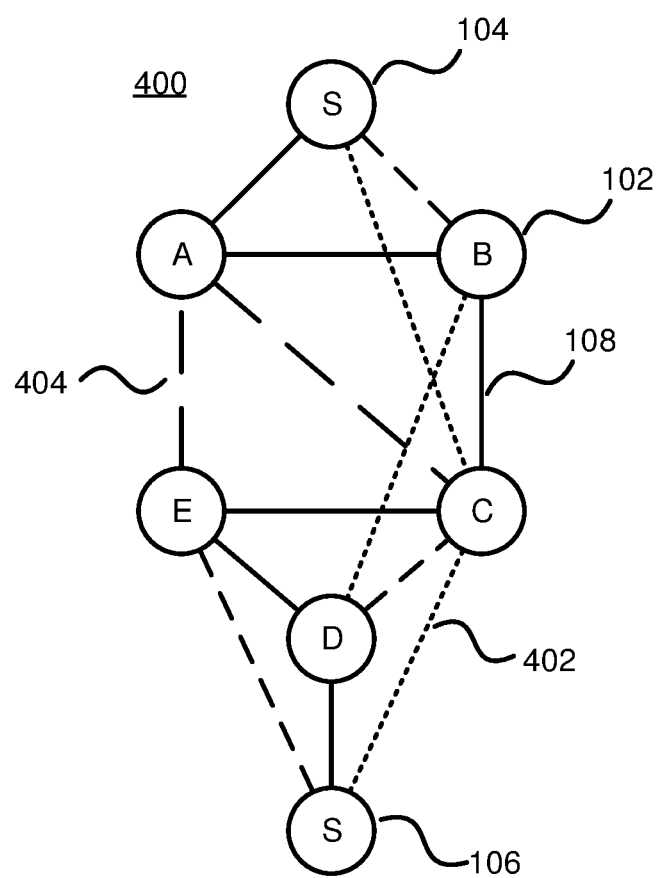
FIG. 4 is a graph diagram representing a high availability data processing network in accordance with the present principles.

In a naïve approach to the high availability problem, a user might be tempted to fully connect the nodes 102 to one another, with each node 102 being connected to each other node 102. Thus, for example, node A might be connected to nodes B, C, and D, rather than just to B and D as shown. However, this deployment is unrealistic, as it necessitates a very complicated real-world set of interconnections, with sixteen cables being needed to provide that level of connectivity. The network 100 shown in FIG. 4 represents the minimum number of links to provide high availability in the four-node example. Each node 102 depends on its local high-availability policies to make decisions based on the changes of status in neighboring nodes. Thus, no central controller is needed to manage the devices.

The high-availability policies are determined in advance, since the link topologies after node failure are predefined and predictable. After the failure of one node, the high-availability problem simplifies to conform to the new network layout. For example, if a given processing network has five nodes (N=5) and needs three nodes to operate (M=3), then two nodes can fail (K=2) without affecting the service level. Thus, while the initial problem may be expressed as N=5, M=3, K=2, the initial policies are determined as if the problem were N=5, M=4, K=1. Then, after the first node failure, the effective network size is reduced and the new problem is expressed as N=4, M=3, K=1.

In the general case, for every problem expressed as N=x, M=y, K=x−y, the initial policies are determined according to N=x, M=x−1, K=1. This problem then reduces to N=x−1, M=x−2, K=1 after a node is lost. This reduction can be performed any number of times, until M=y.

Figure 3:
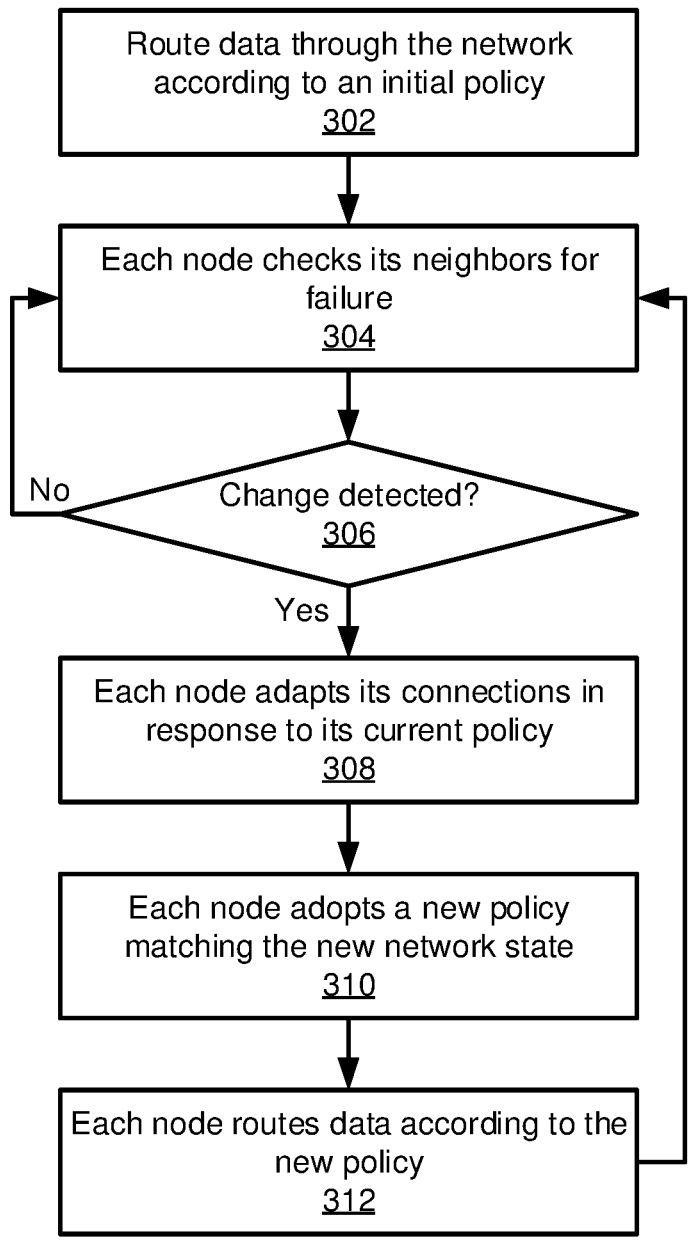
FIG. 3 is a block/flow diagram of a method for high availability data processing recovery in accordance with the present principles.

Referring now to FIG. 3, a method for adaptive routing in a high-availability network is shown. In block 302, each node 102 in the network routes data to its neighbors according to an initial policy, with each node 102 on the active path performing data processing functions on the data it handles. In block 304, each node 102 checks its neighbors for failure. As noted above, this can be performed by any appropriate technique, with examples including checking a link state and detecting the absence of a keep-alive message. This check is performed on a continuous loop, with the loop only being broken when a failure is detected. It should be noted that block 304 may also detect the re-activation of a previously inactive node 202.

When such a failure or other change in the network state is detected, each node 102 adapts its connections in response to its current policy in block 308. For example, when a node 102 detects that the neighbor to which it previously sent data has become inactive, the node 102 deactivates the link 108 to the inactive node 202 and activates a link 108 to a different neighbor. If a previously inactive node 202 has been re-activated, then the nodes 102 may deactivate their active link 108 and re-activate the link 108 to the re-activated node. In block 310, each remaining active node 102 then adopts a new policy that matches the new network state (e.g., moving from an N=5, M=4, K=1 policy to an N=4, M=3, K=1 policy). In block 312, each node 102 routes data according to its new policy and processing returns to block 304.

It should be noted that the same policy can later be used to reestablish communications with a previously failed node that has reactivated. In such a case, the high availability policy that was used to reroute communications when the node failed is used to reverse the changes. For example, links that were brought down are brought back up and links that were brought up are brought back down.

Referring now to FIG. 4, an exemplary five-node graph 400 is shown. The graph shows three kinds of links: active links 108, down inactive links 402, and up inactive links 404. The inactive links 402 and 404 are used as backup links in case a node fails. The down and up inactive links 402 and 404 have no traffic flowing but, in the case of the up inactive links, are in an "up" state. The inactive links are used to propagate state information. When a node 102 fails and the neighboring nodes follow the policy to respond, changes in the up/down states of the down and up inactive links 402 and 404 inform non-neighboring nodes of the change. In this example, the following policy is used:

| Link to | Prev. state | New state | Failed | New path | Action | New ID |
|---|---|---|---|---|---|---|
| | | | Node A | | | |
| Input | Up | Down | Self | C-B-D-E | Bring B down | No change |
| B | Up | Down | B | A-C-D-E | Bring E up | No change |
| C | Up | Down | C | B-A-E-D | Bring input down | No change |
| | | | Node B | | | |
| Input | Down | Up | A | B-C-D-E | | No change |
| A | Up | Down | A | C-B-D-E | Bring D up | No change |
| C | Up | Down | C | B-A-E-D | Bring input up<br>Bring D up | No change |

-continued

| Link to | Prev. state | New state | Failed | New path | Action | New ID |
|---------|-------------|-----------|--------|----------|--------|--------|
| Node C  |             |           |        |          |        |        |
| A | Up | Down | A | C-B-D-E | Bring input up<br>Bring D up | A |
| B | Up | Down | B | A-C-D-E | Bring D up<br>Bring E down | B |
| E | Up | Down | E | A-B-C-D |  | D |
| A | Up | Down | A | B-C-E-D |  | A |
| Node D |  |  |  |  |  |  |
| Output | Up | Down | Self | A-B-C-E | Bring E down | No change |
| B, C | B: Down<br>C: Down | B: Up<br>C: Up | A | C-B-D-E | Bring output down | C |
| B, C | B: Down<br>C: Down | B: Up,<br>C: Down | C | B-A-E-D |  | C |
| C, E | C: Down<br>E: Up | C: Up<br>E: Up | B | A-C-D-E | Bring output down | C |
| E | Up | Down | E | A-B-C-D |  | C |
| Node E |  |  |  |  |  |  |
| Output | Down | Up | Self | A-B-C-D | Bring C down,<br>Bring D down | No change |
| A, C | A: Up<br>C: Up | A: Down<br>C: Down | B | A-C-D-E | Bring output up | D |
| A, C | A: Up<br>C: Down | A: Up<br>C: Down | C | B-A-E-D |  | D |
| A, C | A: Down<br>C: Up | A: Down<br>C: Up | A | C-B-D-E | Bring output up | D |
| D | Up | Down | D | A-B-C-E | Bring output up | D |

It should be noted that not every link shown in FIG. 4 is described in this policy. These additional links are put in place to provide a fall-back graph topology in the event of a node failure. In this example, the additional links will be used in the second policy for the network that characterizes a four node graph after one node has failed.

The initial path through this exemplary graph is A→B→C→E→D. If only three nodes are needed, the graph can afford to lose two nodes before it will be unable to meet processing needs. Rather than addressing every contingent failure of two different nodes, the policy above lists actions to take for the failure of one single node. In an example where the failed node is C, each node may observe changes in its link states. This is represented in the policy by a change from "Prev State" for a link between the node in question and a given node to a "New state" for the link. Following this example then, Node B detects that the link to Node C, which used to be in the "Up" state, is now in the "Down" state. This change, detected by block 306 above, triggers a change in link states according to the policy. After the change, the nodes also change their identifiers in accordance with the "New ID" field. This is done to match the new graph topology to the precalculated policy with four nodes.

The policy indicates that this exemplary change of link states means that Node C has failed, dictating a new graph topology. Node B therefore brings up the link to the Input switch 104. Each node 102 operates locally, based solely on the link states that it can see from its neighbors. The new topology that results from following the policy is B→A→E→D. The changing of link states is performed by block 308 as described above.

Figure 5:
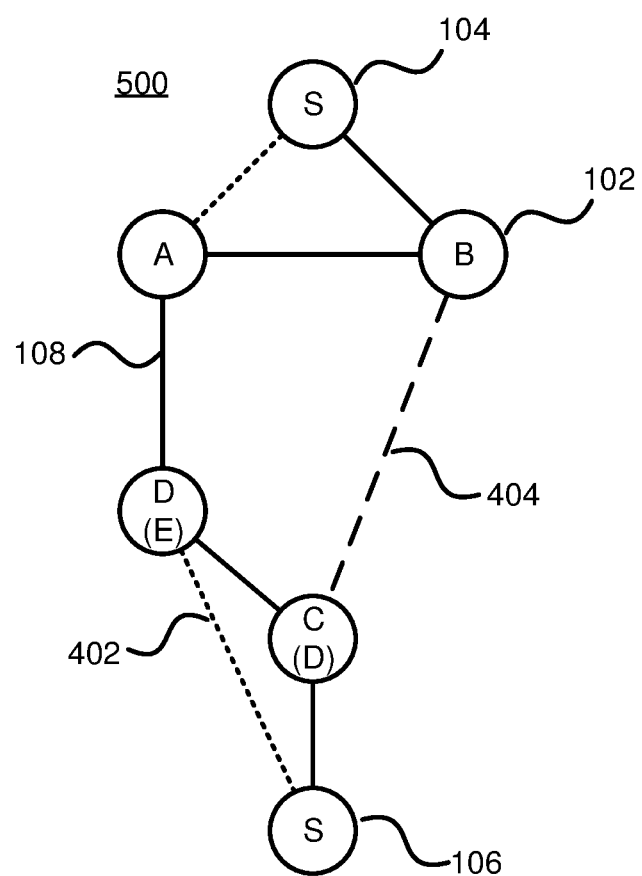
FIG. 5 is a graph diagram representing a high availability data processing network in accordance with the present principles.

Referring now to FIG. 5, an exemplary new graph topology 500 is shown for the state of the network after the failure of node C. The names of the nodes reflect their new states as indicated by the "New ID" field of the policy, with the previous node names being shown in parentheses for clarity. Each node 102 adopts a new policy to reflect the new network topology and to provide for any further node failures. The new policy is a reduction of the original policy and is calculated in advance. Whereas the policy above provides for the loss of one node from a five-node graph, the new policy provides for the loss of one node from a four-node graph—one where the original Node C doesn't exist. It should be noted that the nodes in the new policy may have different names from how they were identified in the original policy. The "New ID" field of the original policy dictates this change, such that the remaining nodes of the original graph conform to the pre-calculated policy. An exemplary policy for the reduced four-node graph is shown below:

| Link to | Prev. state | New state | Failed | New path | Action |
|---------|-------------|-----------|--------|----------|--------|
| Node A  |             |           |        |          |        |
| Input | Up | Down | Self | B-C-D | Bring B down |
| B | Up | Down | B | A-C-D | Bring D up |
| D | Down | Up | C | B-A-D | Bring input down |
| Node B |  |  |  |  |  |
| Input | Down | Up | A | B-C-D |  |
| A | Up | Down | A | B-C-D | Bring input up |
| C | Up | Down | C | B-A-D | Bring input up |
| Node C |  |  |  |  |  |
| Input | Down | Up | D | A-B-C |  |
| B | Up | Down | B | A-D-C | Bring output up |
| D | Up | Down | D | A-B-C | Bring output up |
| Node D |  |  |  |  |  |
| Output | Up | Down | Self | A-B-C | Bring C down |
| A | Down | Up | B | A-D-C | Bring output down |
| C | Up | Down | C | B-A-D | Bring A up |

This policy is pre-calculated and stored at each of the nodes. Because each node changes its identifier as part of the changes dictated by the five-node policy, the single four-node policy suffices to accommodate all of the possible failure cases from the five-node graph.

The present embodiments may be extended to graphs of any number of nodes, with one policy being pre-calculated for each level of failure. For example, in the case where six nodes are present to begin with and where the failure of three nodes is accommodated, a single policy for the six-node graph, a single policy for the five-node graph (after a first node fails), and a single policy for the four-node graph (after a second node fails) are calculated and stored at each node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 6:
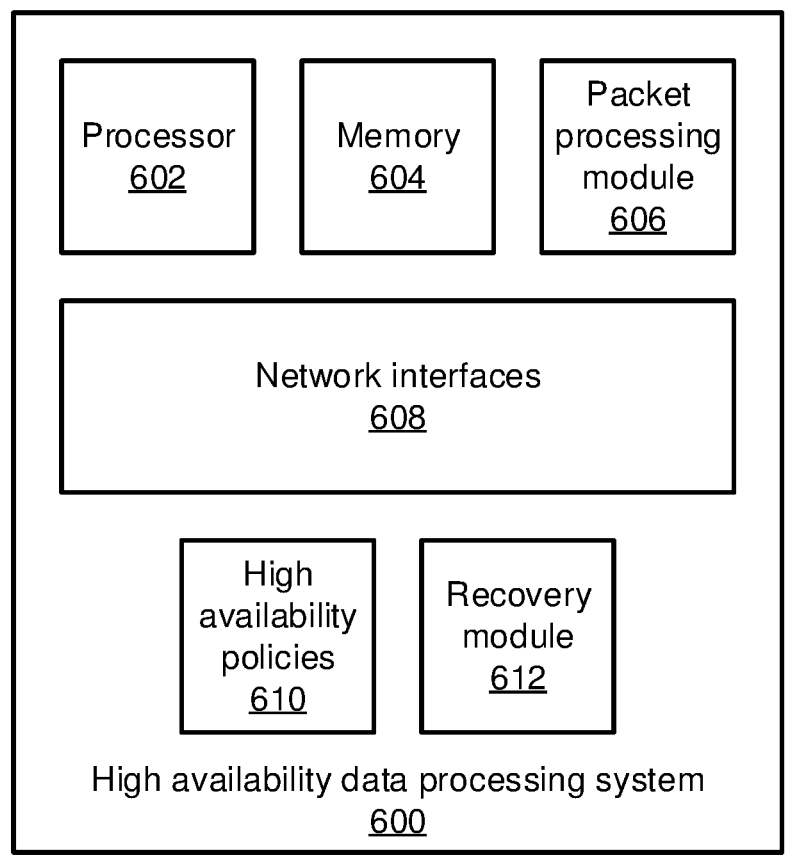
FIG. 6 is a block diagram of a high availability data processing system in accordance with the present principles.

Referring now to FIG. 6, a high availability data processing system 600 is shown. The system 600 includes a hardware processor 602 and memory 604. The system 600 also includes a set of network interfaces 608, each of which connects to a respective network interface 608 of another instance of the system 600 in a network. The system 600 also includes one or more functional modules that may be implemented as software that is stored in the memory 604 and is executed by the processor 602. In an alternative embodiment the functional modules may be implemented as one or more discrete hardware components in the form of, e.g., application specific integrated chips or field programmable gate arrays.

A packet processing module 606 performs the packet processing function of the system 600. In one specific example the packet processing module 606 may perform deep packet inspection, but it should be understood that any form of packet processor or other data processing may be implemented instead. It is specifically contemplated that the processing power of the packet processing module 606 is somewhat less than the total processing power needed to accommodate a full-rate bitstream in the network. Multiple systems 600 may therefore be connected in series so that the summed processing power of the respective packet processing modules 606 is sufficient to fully process the full-rate bitstream.

A recovery module 612 monitors the link states of the connections between systems 600 through the network interfaces 608. The recovery module 612 uses high availability polices 610 to recognize a change in the network's state and to manipulate the link states of the network interfaces to re-route traffic and to maintain sufficient processing power to accommodate the full-rate bitstream. After the failure of a system 600 in the network has been recognized, the recovery module 612 brings individual links of the network interfaces 608 up or down in accordance with a high availability policy 610 that corresponds to the pre-failure network state. The recovery module 612 then adopts a new high availability policy 610 for a network having one fewer high availability data processing system 600, with the identity of the particular system 600 in question for the new policy being dictated by the previous policy.

Figure 7:
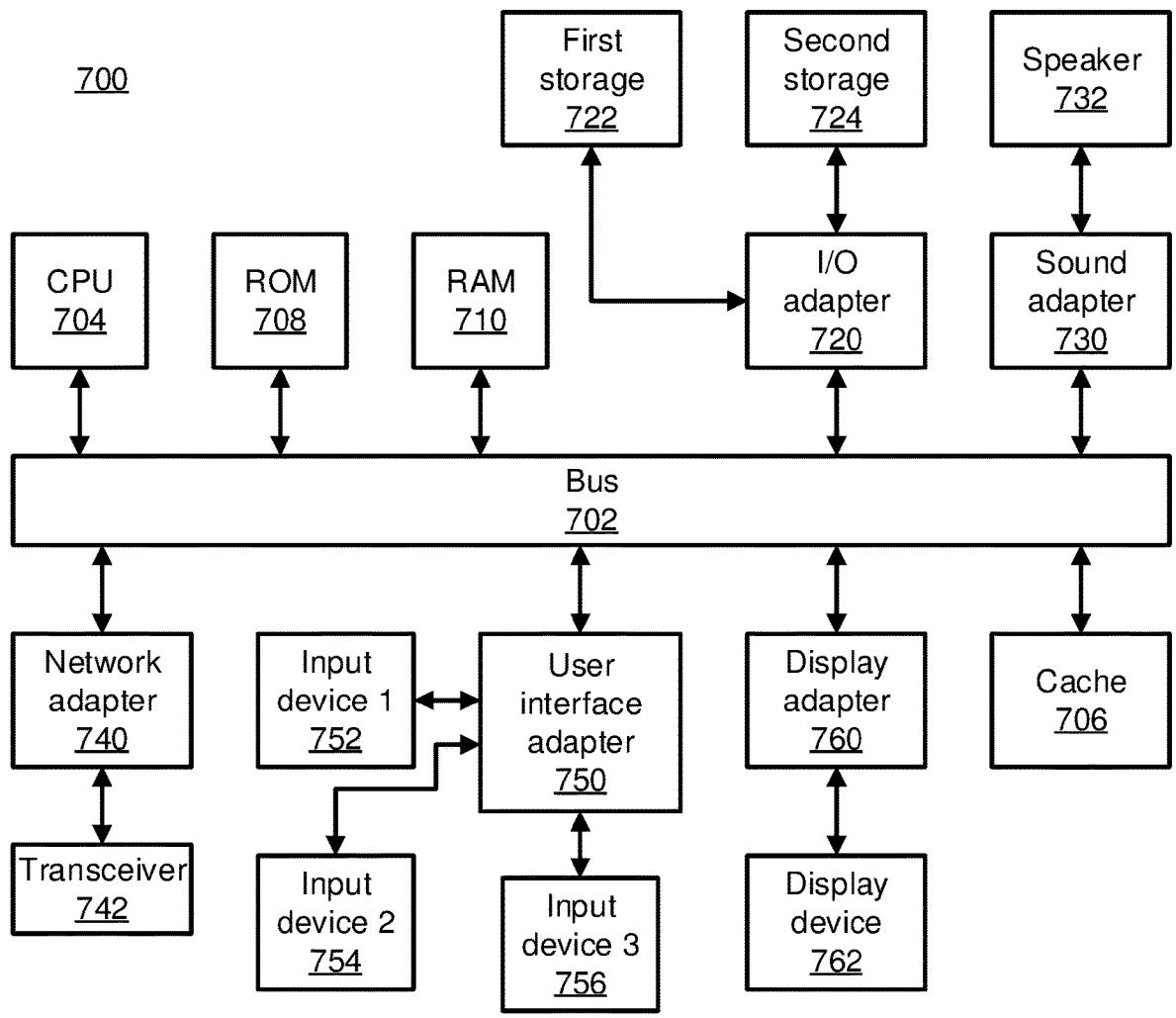
FIG. 7 is a block diagram of a data processing system in accordance with the present principles.

Referring now to FIG. 7, an exemplary processing system 700 is shown which may represent the high availability data processing system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of high availability in packet processing for high-speed networks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for high-availability data processing, comprising:

detecting, at a first data processing system that stores a plurality of high availability policies, each high availability policy corresponding to a respective number of processing system failures in a network, a change in link state between the first data processing system and a second data processing system;

changing a link state between the first data processing system and a third data processing system responsive to said detection in accordance with a first high availability policy stored of the plurality of high availability policies at the first data processing system;

changing an identifier of the first data processing system in accordance with the first high availability policy to conform to a second high availability policy of the plurality of high availability policies stored at the first data processing system; and repeating said detecting, changing the link state, and changing the identifier in accordance with the second high availability policy.

2. The method of claim 1, wherein the detected change in the link state comprises one of a link coming up and a link going down.

3. The method of claim 1, wherein changing the link state comprises one of bringing up a link that is down and bringing down a link that is up.

4. The method of claim 1, wherein at least one of the link between the first data processing system and the second data processing system and the link between the first data processing system and the third data processing system has an "up" state without any traffic being transmitted on the link.

5. The method of claim 1, further comprising performing a data processing function at one or more of the first data processing system, the second data processing system, and the third data processing system.

6. The method of claim 5, wherein a plurality of data processing systems are connected in serial before and after changing the link state to perform the data processing function on a full-rate bitstream.

7. The method of claim 1, wherein changing the link state routes data traffic around a failed data processing system.

8. The method of claim 1, further comprising reversing the change to the link state and the change of the identifier in response to detecting that a previously failed data processing system has reactivated.

9. The method of claim 1, wherein the first high availability policy dictates actions to be taken in case of a failure in a networking having a first number of data processing systems and the second high availability policy dictates actions to be taken in case of a failure in a network having a second number of data processing systems.

10. A computer program product for high-availability data processing, the computer program product comprising a computer readable storage medium having program instructions embodied therewith, the program instructions readable by a computer to cause the computer to:

detect, at a first data processing system that stores a plurality of high availability policies, each high availability policy corresponding to a respective number of processing system failures in a network, a change in link state between the first data processing system and a second data processing system;

change a link state between the first data processing system and a third data processing system responsive to said detection in accordance with a first high availability policy of the plurality of high availability policies stored at the first data processing system;

change an identifier of the first data processing system in accordance with the first high availability policy to conform to a second high availability policy of the plurality of high availability policies stored at the first data processing system; and repeat said detection, change of the link state, and change of the identifier in accordance with the second high availability policy.

11. A high-availability data processing system, comprising:

a memory configured to store a plurality of high availability policies, each high availability policy corresponding to a respective number of data processing system failures in a network; and a network interface configured to detect a change in link state between the network interface and a second data processing system and to change a link state between the network interface and a third data processing system responsive to said detection in accordance with a first high availability policy of the plurality of high availability policies; and a recovery module configured to change an identifier of the high availability data processing system in accordance with the first high availability policy to conform to a second high availability policy of the plurality of high availability policies, wherein the network interface and the recovery module are further configured to repeat said detection, change of the link state, and change of the identifier in accordance with the second high availability policy.

12. The system of claim 11, wherein the detected change in the link state comprises one of a link coming up and a link going down.

13. The system of claim 11, wherein the network interface is further configured to perform one of bringing up a link that is down and bringing down a link that is up.

14. The system of claim 11, wherein at least one of the link between the network interface and the second data processing system and the link between the network interface and the third data processing system has an "up" state without any traffic being transmitted on the link.

15. The system of claim 11, further comprising a packet processing module configured to perform a data processing function.

16. The system of claim 15, wherein the high availability data processing system is connected in serial with one or more other data processing systems before and after changing the link state to perform the data processing function on a full-rate bitstream.

17. The system of claim 11, wherein changing the link state routes data traffic around a failed data processing system.

18. The system of claim 11, wherein the network interface and the recovery module are further configured to reverse the change to the link state and the change of the identifier in response to detecting that a previously failed data processing system has reactivated.

* * * * *